United States Patent
Lenzner

(10) Patent No.: US 11,620,697 B2
(45) Date of Patent: Apr. 4, 2023

(54) SYSTEMS AND METHODS OF POLYMORPHIC CONTENT GENERATION

(71) Applicant: Salesforce, Inc., San Francisco, CA (US)

(72) Inventor: Marcus Lenzner, Jena (DE)

(73) Assignee: Salesforce, Inc., San Francisco, CA (US)

( * ) Notice: Subject to any disclaimer, the term of this patent is extended or adjusted under 35 U.S.C. 154(b) by 90 days.

(21) Appl. No.: 17/158,071

(22) Filed: Jan. 26, 2021

(65) Prior Publication Data
US 2022/0237689 A1 Jul. 28, 2022

(51) Int. Cl.
*G06F 16/958* (2019.01)
*G06Q 30/0601* (2023.01)

(52) U.S. Cl.
CPC ....... *G06Q 30/0641* (2013.01); *G06F 16/972* (2019.01)

(58) Field of Classification Search
CPC .................................................... G06F 16/972
See application file for complete search history.

(56) References Cited

U.S. PATENT DOCUMENTS

| | | | |
|---|---|---|---|
| 10,788,957 B1 | 9/2020 | Lenzner | |
| 10,789,413 B2 | 9/2020 | Lenzner | |
| 2002/0026462 A1* | 2/2002 | Shotton, Jr. | G06F 16/9577 715/239 |
| 2020/0272681 A1* | 8/2020 | Macxis, Jr. | G06F 40/143 |
| 2020/0279010 A1 | 9/2020 | Lenzner | |
| 2021/0011957 A1 | 1/2021 | Lenzner | |

* cited by examiner

*Primary Examiner* — Roland J Casillas
(74) *Attorney, Agent, or Firm* — Butzel Long

(57) ABSTRACT

Systems and method are provided for receiving, at a server, a request to generate a page with content. The server may determine an output type for the page based on the received request. Object data may be retrieved for the content of the page, and the content for the page may be determined. Content data for the determined output type may be serialized based on the retrieved object data. The page may be generated to be transmitted for output based on the serialized content data.

22 Claims, 9 Drawing Sheets

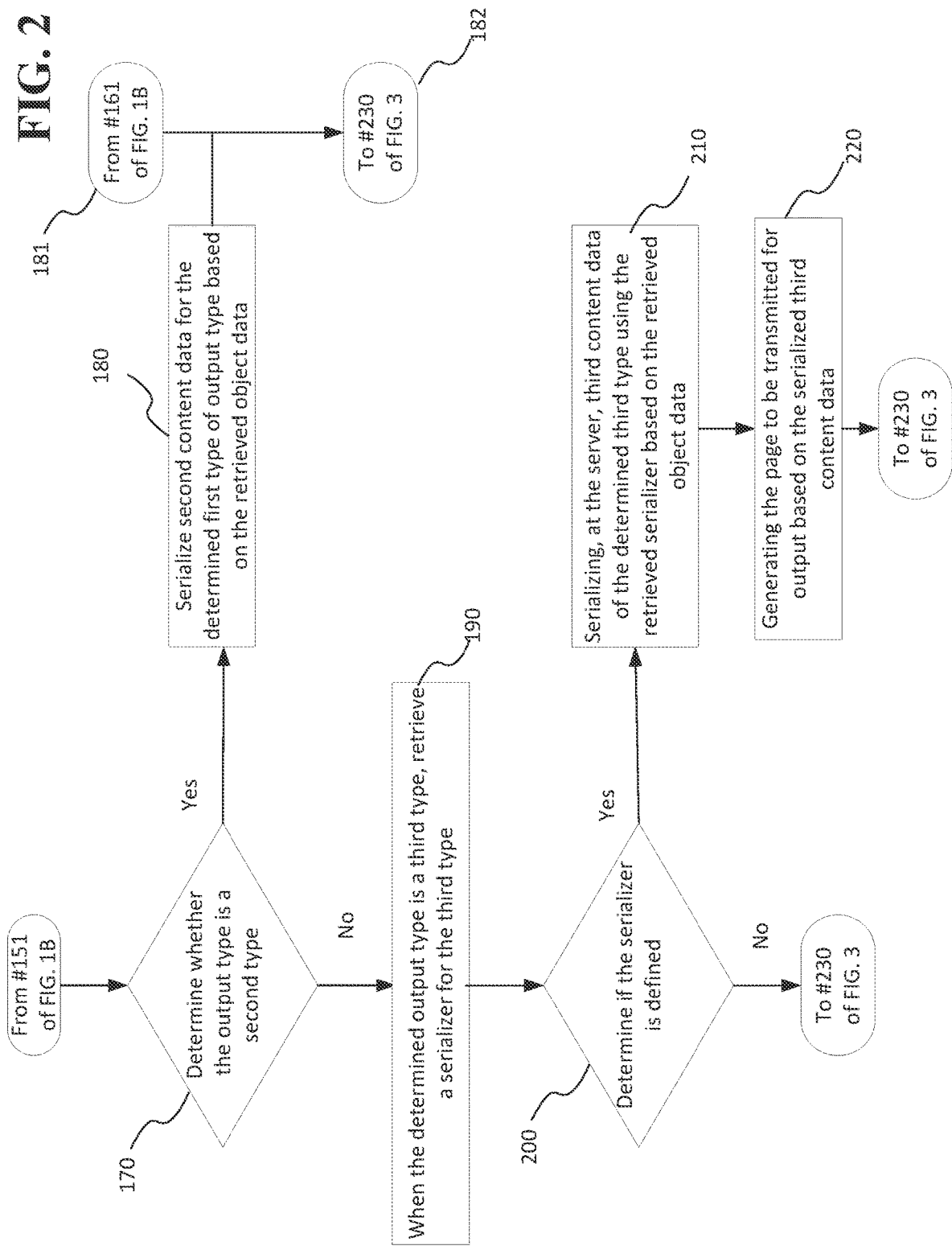

SYSTEMS AND METHODS OF POLYMORPHIC CONTENT GENERATION

BACKGROUND

Presently, merchants assemble content to be presented to customers. The assembly process typically consists of plugging together multiple building blocks in order to present a visual experience to shoppers. The content usually has to be served to different channels, such as a business-to-consumer (B2C) storefront shopping page, a native application for a smartphone or tablet, a social media channel, or the like. These different channels require different representations of the same set of content, independent of one another.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1A-3 show example methods of polymorphic content generation according to an implementation of the disclosed subject matter.

DETAILED DESCRIPTION

Figure 1A:
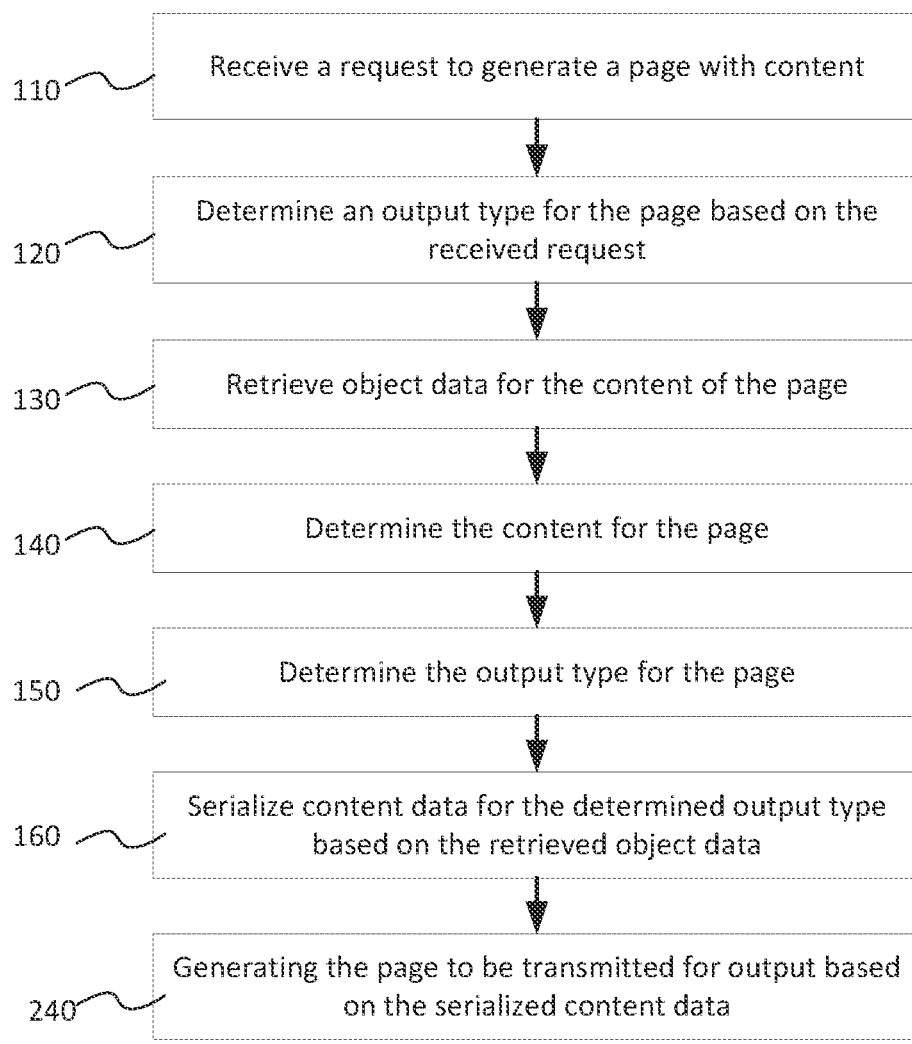

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of generating and/or arranging content to be viewed by customers without having to separately create pages for each type of delivery channel system, such as a business-to-consumer (B2C) storefront shopping page, a native application ("app") for a smartphone or tablet (e.g., an iOS™ or Android™ app), a social media channel, or the like. Implementations of the disclosed subject matter may embed customized information into a platform, such as a web page, having a custom format. That is, the implementations of the disclosed subject matter may generate a page in a format agnostic way, so that it may be coded once and then reused across the different implementations for output generation. The generated output may be mapped to a target channel and/or page that the information is tailored for. This may eliminate having to individually generate tailored content by hand, and may avoid having to make separate application program interface (API) calls, which may consume computation and network resources.

Implementations of the disclosed subject matter place content and/or components per page into a subset of components that are visible for one or more customers (e.g., when the one or more customers are part of an applicable customer group) to provide customized information. Output for each web page and/or channel may be different, which makes each page provided different (i.e., polymorphic). Implementations of the disclosed subject matter may maintain consistency of information across platforms (e.g., for desktop computers, tablets, wearable computing devices, smartphones, and the like, and/or websites and/or social media platforms), and have different pages and/or channels that are targeted to particular customers.

In contrast, merchants using present systems typically join multiple building blocks together in order to present a web page or the like to customers. Content is typically provided to different channels, and these different channels require different representations of the same set of content, independent of one another. Such present systems typically have separate code bases or sub-systems to separately generate pages for different channels. That is, unlike implementations of the disclosed subject matter, present systems must condense the set of components to a page based on customer segmentation (i.e., groupings of one or more customers), scheduling, and the like for each of the different systems of the channels. Such generation of pages for all of the different systems and channels may use substantial computer system resources and/or may require efforts from persons employed by merchants. Moreover, such present systems must make repeated API calls to a server in order to render the page, which may be both time consuming, and which may typically consume computational and network resources. This may reduce the time to generate and/or select custom content for a custom page to be generated.

FIGS. 1A-3 show an example methods of polymorphic content generation according to an implementation of the disclosed subject matter. FIG. 1A shows an example method of polymorphic content generation that includes serializing content data for a page to be generated and transmitted based on a determined output type of the page. FIGS. 1B-3 show a more detailed example of the method shown in FIG. 1A, where FIGS. 1B-3 shows different serialization of content data based on the determined output type.

Figure 1B:
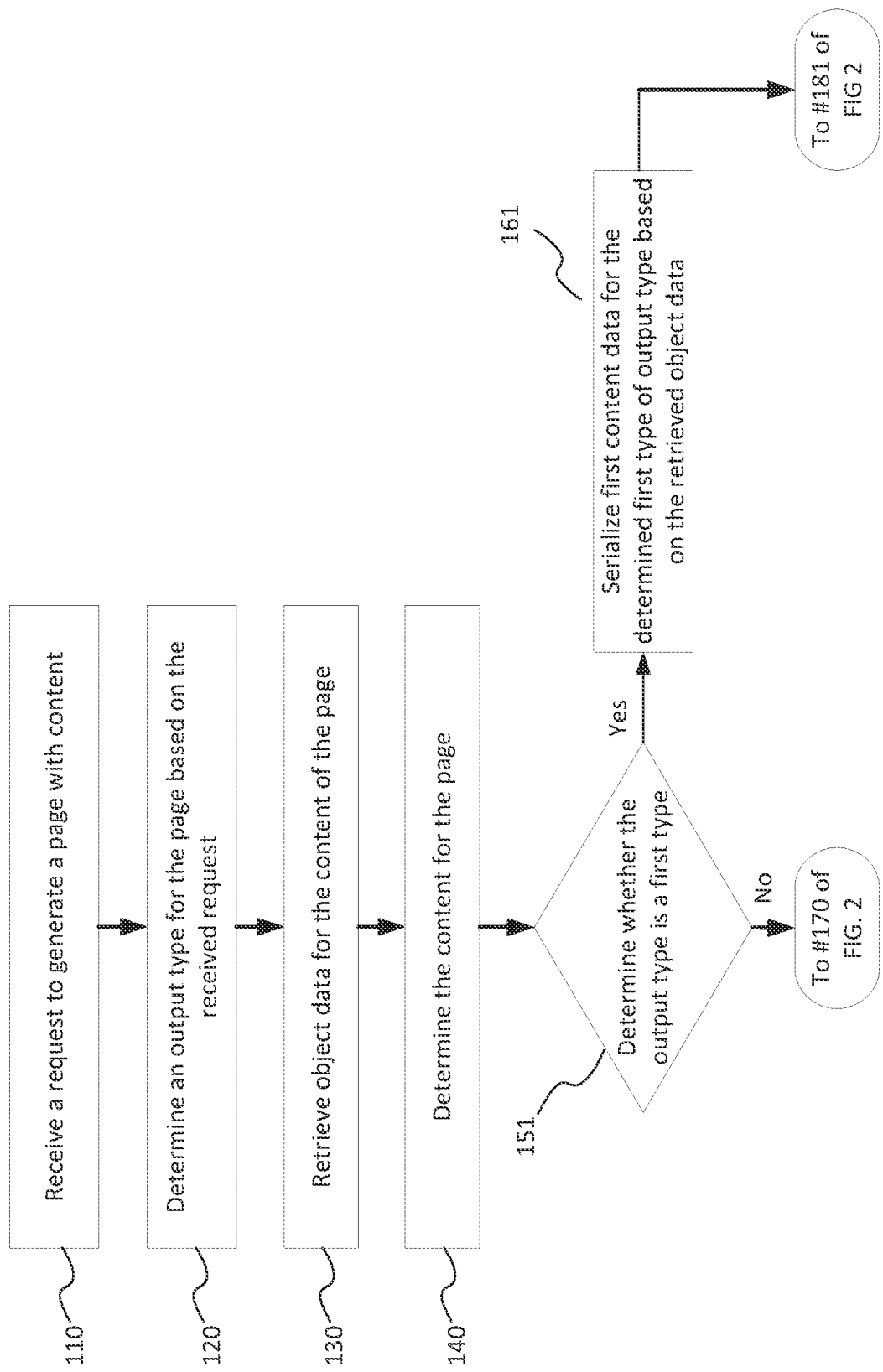

At operation 110 shown in FIGS. 1A-1B, a server (e.g., server 700 shown in FIG. 8) may receive a request to generate a page with content. The request may be generated by computer 500 shown in FIG. 8, and received by the server 700 via the communications network 600. The page may be a webpage having content for one or more target audiences and/or consumers.

Figure 7:
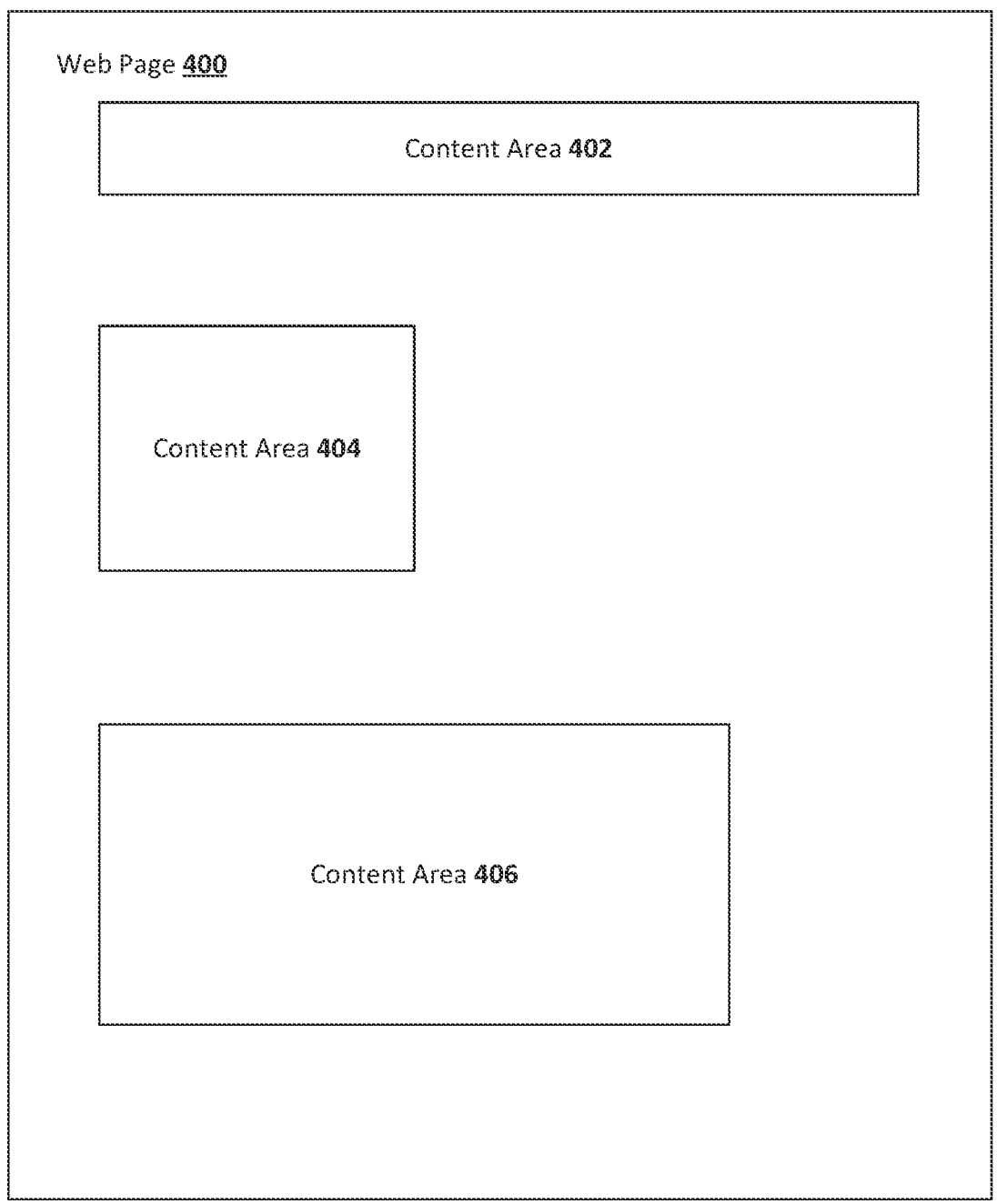
FIG. 7 shows a webpage with one or more content areas to be generated using the example methods of FIG. 1A-6 according to an implementation of the disclosed subject matter.

For example, the server may receive a request to generate a web page 400 shown in FIG. 7 that may include one or more content areas that the server may place content, such as content area 402, 404, and/or 406. In this example, the web page 400 may be for a particular product in a product catalog, or a page to promote a particular product or service. Content area 402 may be a header and/or banner to promote the product. Content area 404, 406, and the like may include an image of the product, a price of the product, a description of the product, customer ratings and/or comments for the product, technical support for the product, and the like. As discussed below, the server may selected content for the content areas 402, 404, 406 that may be targeted for one or more users, one or more groups, or the like.

Web page 400 and content areas 402, 404, 406 shown in FIG. 7 are merely an example, and the number and/or location of the content areas may differ from those shown. For example, the arrangement and/or location of content areas 402, 404, 406 and/or the number of content areas on the web page 400 may differ based on whether the page is to be displayed on a desktop or laptop computer, a tablet, a smartphone, a wearable computing device, or the like.

At operation 120, the server may determine an output type for the page based on the received request. For example, the output type may be HTML (hypertext markup language), JSON (Javascript Object Notation), XML (extensible markup language), a custom or proprietary output type, or the like. For example, the server may determine that the content areas 402, 404, 406 of the web page 400 shown in FIG. 7 to be generated by the server may be an HTML output type, a JSON output type, an XML output type, or the like, based on the received request.

At operation 130, the server may retrieve object data for the content of the page. For example, the server may retrieve the object data to generate the page with content by retrieving the object data from storage 710 and/or database 800 shown in FIG. 8 and described in detail below. For example, the server may retrieve the object data to generate the web page 400 shown in FIG. 7, where the object data may be placed in content area 402, 404, and/or 406.

Figure 4:
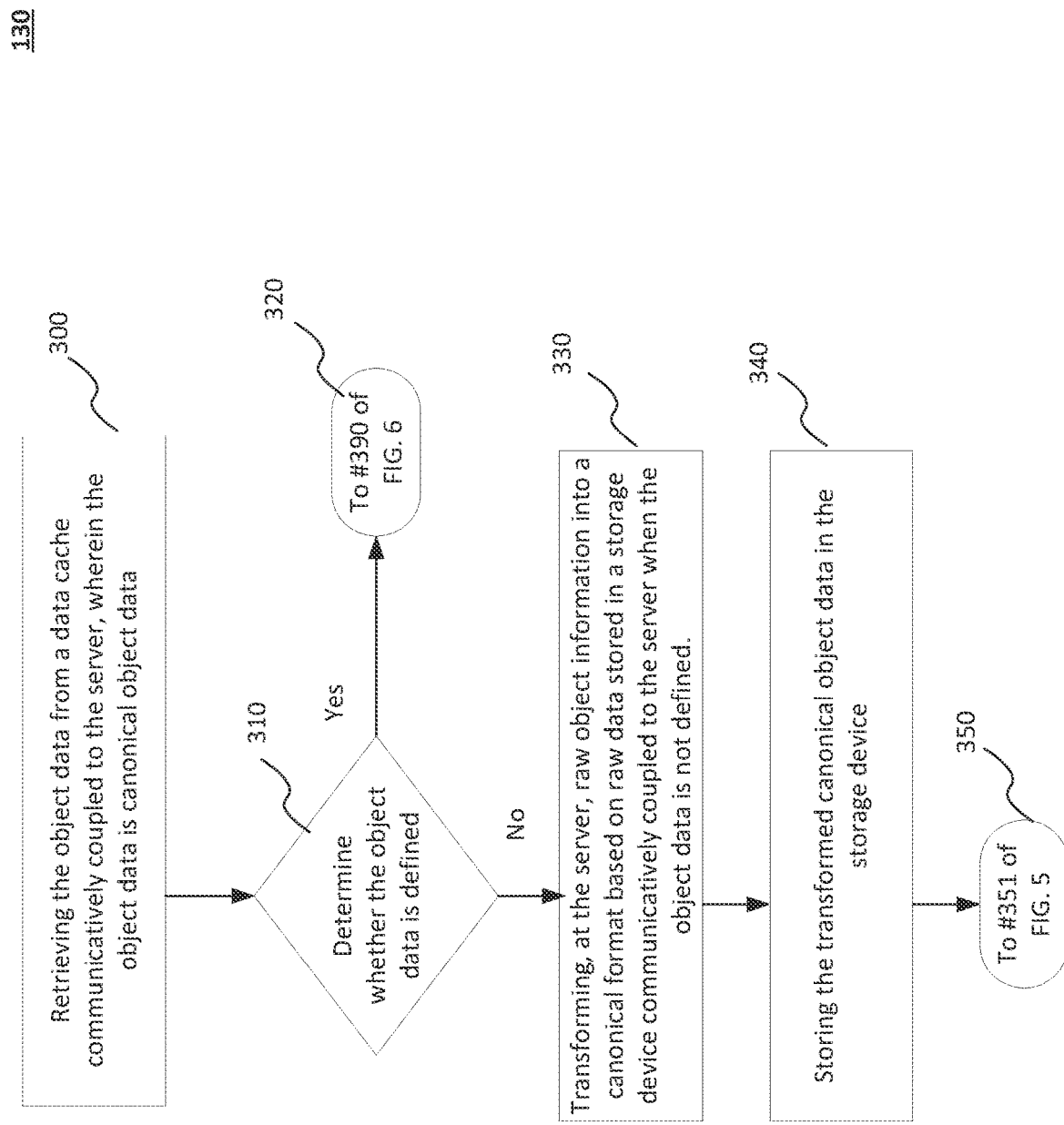
FIGS. 4-6 show retrieving object data for the polymorphic content generation methods of FIGS. 1A-3 according to an implementation of the disclosed subject matter.
Figure 5:
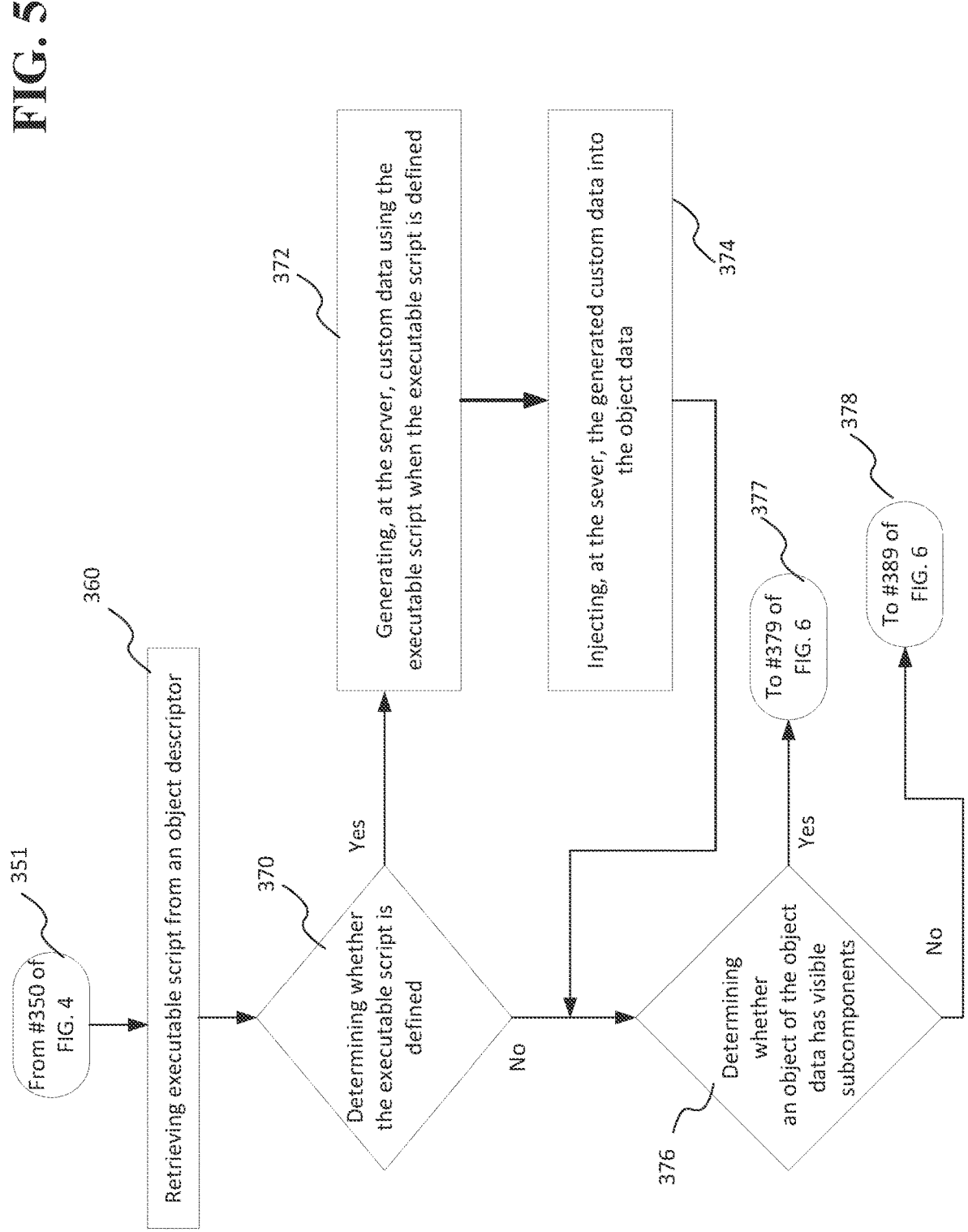
Figure 6:
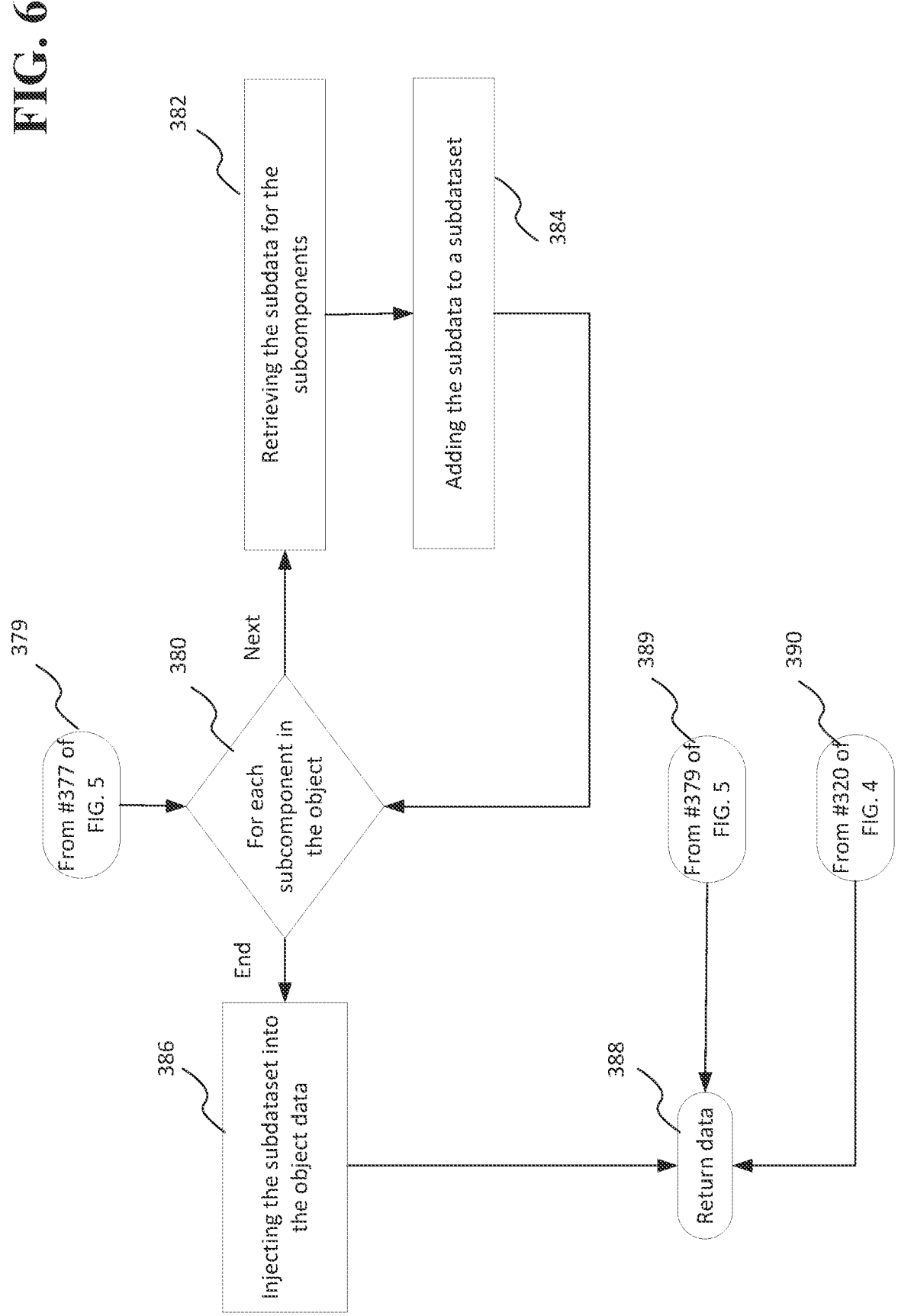

Details about operation 130 are shown in FIGS. 4-6. At operation 300 shown in FIG. 4, the object data may be retrieved by the server (e.g., server 700 shown in FIG. 8) from a data cache (e.g., storage 700 shown in FIG. 8) communicatively coupled to the server, where the object data is canonical object data. Canonical object data may be a superset of all the other data (e.g., HTML, data, JSON data, or the like). In some implementations, a translator module or layer may be used to exchange data with other modules.

At operation 310, the server may determine whether the object data is defined. That is, the server may determine whether there are meta-descriptors which describe and/or define which attributes can be managed on the page (e.g., web page 400 shown in FIG. 7) and which areas (e.g., content area 402, 404, and/or 406 shown in FIG. 7) exist for content arrangement within the page. As described in detail below, the meta-descriptors define and/or describe the attributes a merchant may set up for one or more components of a page once the merchant creates at least one component during a content authoring process. The attributes to be managed on a page may include the location of the content on the page, the type of content on the page, and the like. When the server determines that the object data is defined at operation 310, the operations 390 and 388 may be performed as shown in FIG. 6. That is, the data may be returned, and the server may perform operation 140 as shown in FIG. 1. When the server determines that the data is not defined at operation 310 of FIG. 4, the server may transform raw object information into a canonical format based on raw data stored in a storage device communicatively coupled to the server at operation 330.

Figure 8:
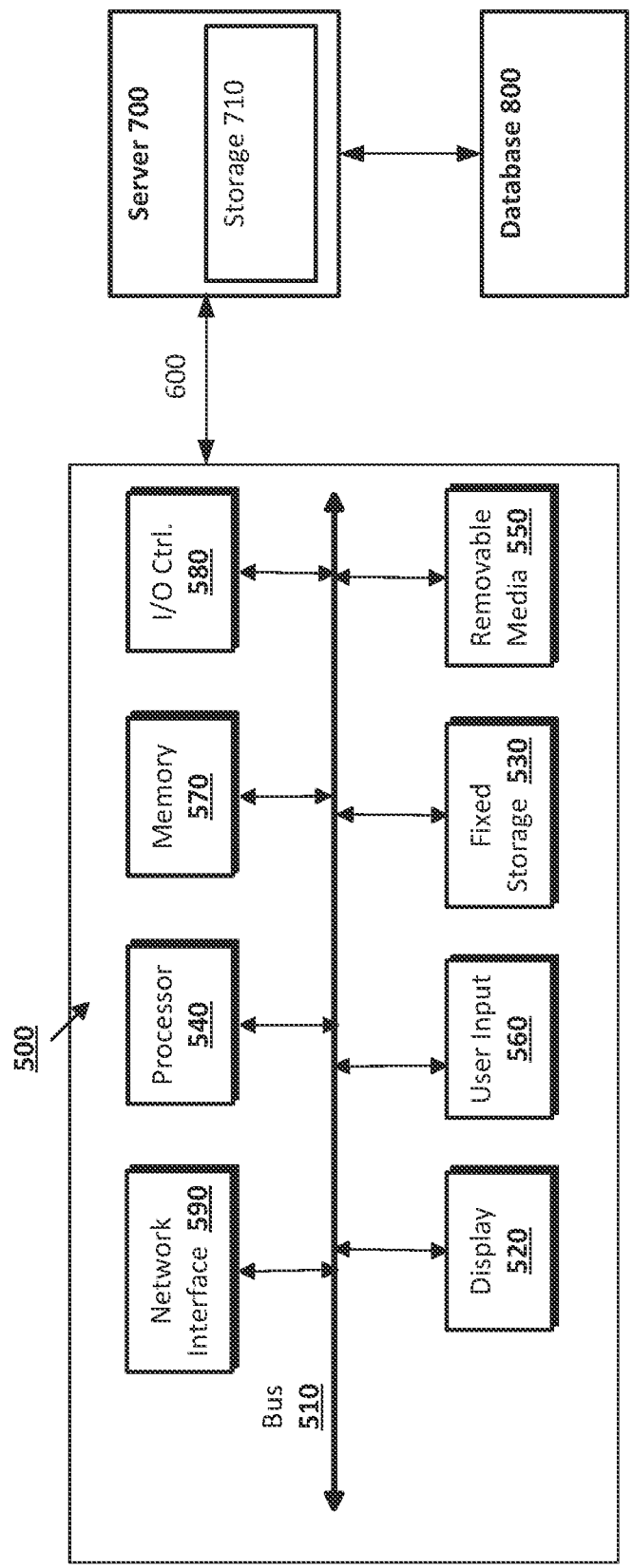
FIG. 8 shows an example system that implements the methods of FIGS. 1A-6 according to an implementation of the disclosed subject matter.

At operation 340, the server may store the transformed canonical object data in the storage device (e.g., storage 710 and/or database 800 shown in FIG. 8). As shown in FIGS. 4-5, references 350 and 351 may show the connection between operation 340 of FIG. 4 and operation 360 shown in FIG. 5. At operation 360, the server may retrieve an executable script from an object descriptor. As described in detail below, the executable script may be used to generate and/or select data that may be used in generating a custom web page (e.g., web page 400 shown in FIG. 7) that may be targeted to one or more persons, one or more groups, or the like.

At operation 370, the server may determine whether the executable script is defined. The server may determine whether the executable script is defined by determining whether it is within the object descriptor, where the server may retrieve the executable script from a storage location based on the description in the object descriptor. When the server determines that executable script is defined, the server may generate custom data using the executable script at operation 372, and may inject the generated custom data into the object data at operation 374.

When the server determines that the executable script is not defined at operation 370 or after injecting the generated custom data into the object data at operation 374, the server may determine whether an object of the object data has visible subcomponents at operation 376. As used throughout, the subcomponents may be visible if the server may determine whether the subcomponents are accessible by the server. If the location of the executable script is not within the object descriptor, the server may determine whether there are subcomponents of the object data. If the server determines that the object does not have visible subcomponents at operation 376, reference 378 of FIG. 5 and reference 389 of FIG. 6 may link operation 376 to returning the data at operation 388 as shown in FIG. 6 and described below.

When the server determines that the object of the object data has visible components at operation 376, reference 377 of FIG. 5 and reference 379 of FIG. 6 may link operation 376 with operation 380, which may examine each subcomponent in the object. For each subcomponent in the object, the server may retrieve the subdata for the subcomponents and adding the subdata to a subdataset at operation 382. The subdata may be retrieved from storage 710 and/or database 800 shown in FIG. 8. At operation 384, the server may inject the subdataset into the object data. As shown in FIG. 6, operations 382 and 384 may be repeated for each subcomponent in the object, and operation 380 may be repeated to determine if there are additional subcomponents of the object. When the server determines that there are no subcomponents remaining at operation 380, the server may inject the subdataset into the object data at operation 386, and the data may be returned at operation 388.

When the data is returned at operation 388, the server may determine the content for the page at operation 140 shown in FIGS. 1A-1B. That is, the server may determine the content to be placed in content areas 402, 404, and/or 406 of web page 400 shown in FIG. 7. At operation 150, the server may determine the output type for the page. At operation 160, when the server determines that the output type, the server may serialize the first content data for the determined first type of output type based on the retrieved object data at operation. In some implementations, the server may select the serializer based on the determined output type. At operation 240, the server may generate the page to be transmitted for output based on the serialized content data. Operations 150, 160, and 240 are discussed in detail below in connection with FIGS. 1B-3.

FIGS. 1B-2 may show more detailed operations that may be part of operations 150, 160, and 240 of FIG. 1A. For example, operation 150 of FIG. 1A may include operations 151, 170 and 190 shown in FIGS. 1B-2. Operation 160 of FIG. 1B may include operations 161, 180, 200, and 210 shown in FIGS. 1B-2. Operation 240 may include operations 220, 230, 241 and 250 of FIGS. 2-3.

In operation 151 shown in FIG. 1B, the server may determine whether the output type is a first type. For example, the server may determine whether the output type is an HTML, output type. When the server determines that the output type is the first type, the server may serialize first content data for the determined first type of output type based on the retrieved object data at operation 161. For example, the server may determine that the output type is an HTML output type, and may serialize the content data to be output in the HTML output type.

When the server determines that the output type is not a first output type at operation 151, the server may determine whether the output type is a second type at operation 170 shown in FIG. 2. For example, the server may determine whether the output type is a JSON output type. When the output type is a second output type, the server may serialize second content data for the determined second type of output type based on the retrieved object data at operation 180. For example, the server may determine that the output type is a JSON output type, and may serialize the content data to be output in the JSON output type.

When the output type is neither the first output type nor the second output type, the server may determine that the output type is a third output type at operation 190, and may retrieve a serializer for the third type at operation 190. For example, the server may determine that the output type is neither an HTML, output type, nor a JSON output type, but may be a third output type, such as XML (extensible markup language) or a proprietary format. At operation 200, the server may determine whether the serializer is defined. The server may determine whether the serializer is defined by determining whether it is within the object descriptor, where the server may retrieve the serializer from a storage location based on the description in the object descriptor. When the serializer is defined, the server may serialize third content data of the determined third type using the retrieved serializer based on the retrieved object data at operation 210. The server may generate the page to be transmitted for output based on the serialized third content data at operation 220.

Figure 3:
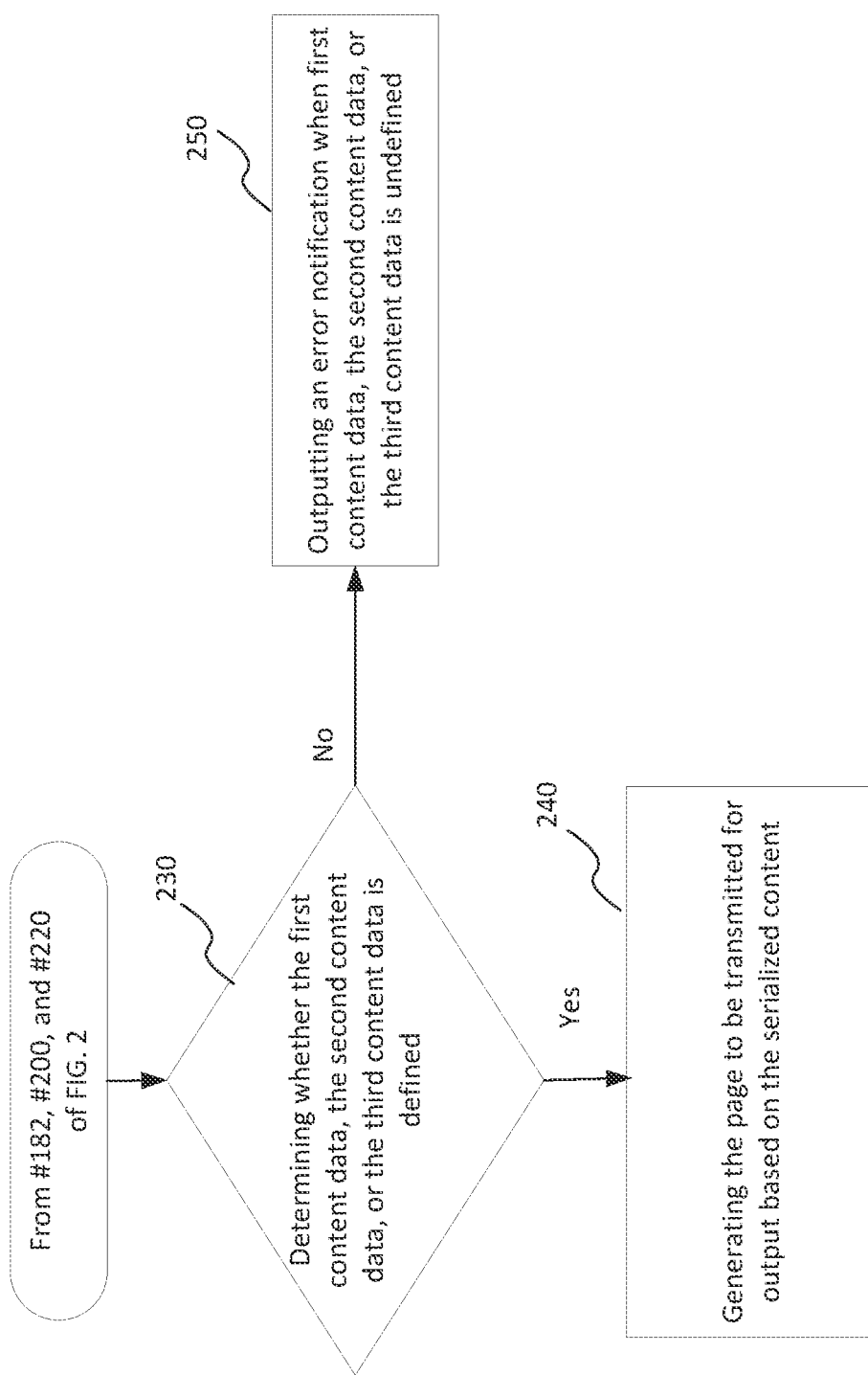

When the serializer is determined not to be defined at operation 200, or after the completion of operations 180 or 220, the server may determine whether the first content data, the second content data, or the third content data is defined at operation 230 shown in FIG. 3. That is, the server may determine whether there are descriptors (i.e., components types) and/or meta-descriptors which describe and/or define content and/or components for a page, and which areas (e.g., content area 402, 404, and/or 406 shown in FIG. 7) exist for content arrangement (i.e., components) within the page. Data created by a merchant for a page for a particular component type may be referred to as a component. Components may include placement information and content data. The meta-descriptors may describe the attributes a merchant may set up per component once the merchant creates at least one component during a content authoring process. The meta-descriptors may describe the one or more places in a page that the merchant can move the component to on a page (i.e., dropzones). The meta-descriptors may define code portions that are to be run at processing time, such as serializer code to serialize content data. That is, the meta-descriptors may define where an image of a product is placed on a page, where the description of the product is placed on the page, the types of information to be displayed on a particular product page, or the like. The meta-descriptors may define the layout of components and/or content on a page, and may define the number of components and/or content items on a page. The number and arrangement of components and/or content items may be customized for a particular page for one or more customers.

When the content data is defined, the server may generate the page (e.g., web page 400 shown in FIG. 7) to be transmitted for output at operation 240. That is, when the first content data is defined at operation 230, the serialized first content data may be used to generate the page for output at operation 240. Alternatively, when the second content data is determined to be defined at operation 230, the serialized second content data may be used to generate the page for output at operation 240. In another alternative, when the third content data is determined to be defined at operation 230, the serialized second content data may be used to generate the page for output at operation 240. When it is determined at operation 230 that the content data is not defined, the server may output an error notification at operation 250 when first content data, the second content data, or the third content data is undefined.

Implementations of the presently disclosed subject matter may be implemented in and used with a variety of component and network architectures. FIG. 8 is an example computer 500 which may generate a request to generate a page with content, and/or display a generated a page (e.g., web page 400 shown in FIG. 7) based on the output from the example methods shown in FIGS. 1-6.

As shown in FIG. 8, the computer 500 may communicate with a server 700 (e.g., a server, cloud server, database, cluster, application server, neural network system, or the like) via a wired and/or wireless communications network 600. Although one server 700 is shown in FIG. 8, the server 700 may be a plurality of servers, cloud servers, databases, clusters, application servers, neural network systems, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 800, which may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the server 700 and/or database 800 can store data, such as content and/or components to be placed in a page, groups of one or more users, executable script, subdata, subcomponents, output types, or the like. Further, if the storage 710 and/or database 800 is a multitenant system, the storage 710 and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 8 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multi-tenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "retrieving," "generating," "serializing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   receiving, at a server, a request to generate a page with content;
   determining, at the server, an output type for the page based on the received request;
   retrieving, at the server, object data for the content of the page;
   determining, at the server, the content for the page by:
      in response to determining whether the output type is a first type, serializing first content data for the determined first type of output type based on the retrieved object data;
      in response to determining whether the output type is a second type, serializing second content data for the determined second type of output type based on the retrieved object data; and
      in response to determining whether the output type is a third type, serializing third content data for the determined third type of output type based on the retrieved object data,
      wherein a serializer is retrieved by the server in response to determining whether the output is at least one selected from the group consisting of: the first type, the second type, and the third type, and wherein at least one selected from the group consisting of: the first content data, the second content data, and the third content data is serialized by the retrieved serializer, and
   generating, at the server, the page to be transmitted for output based on at least one selected group consisting of: the serialized first content data for the determined first type, the serialized second content data for the determined second type, and the serialized third content data for the determined third type.

2. The method of claim 1, wherein the retrieving the serializer comprises:
   determining whether the retrieved serializer is defined; and
   serializing, at the server, the third content data of the determined third type using the defined retrieved serializer based on the retrieved object data.

3. The method of claim 1, further comprising:
   determining whether the first content data, the second content data, or the third content data is defined; and
   generating the page to be transmitted for output based on the serialized first content data, second content data, or third content data when the first content data, the second content data, or the third content data is defined; and
   outputting an error notification when first content data, the second content data, or the third content data is undefined.

4. The method of claim 1, wherein the retrieving the object data comprises:
   retrieving the object data from a data cache communicatively coupled to the server, wherein the object data is canonical object data.

5. The method of claim 4, wherein the retrieving the object data comprises:
   transforming, at the server, raw object information into a canonical format based on raw data stored in a storage device communicatively coupled to the server when the object data is not defined.

6. The method of claim 5, further comprising:
   storing the transformed canonical object data in the storage device.

7. The method of claim 6, further comprising:
   retrieving, at the server, executable script from an object descriptor.

8. The method of claim 7, further comprising:
   determining, at the server, whether the executable script is defined.

9. The method of claim 8, further comprising:
   generating, at the server, custom data using the executable script when the executable script is defined; and
   injecting, at the server, the generated custom data into the object data.

10. The method of claim 8, further comprising:
    determining, at the server, whether an object of the object data has visible subcomponents.

11. The method of claim 10, further comprising:
    for each subcomponent in the object, retrieving the subdata for the subcomponents and adding the subdata to a subdataset; and
    injecting, at the server, the subdataset into the object data.

12. A system comprising:
    a server having at least one processor and a memory to:
       receive a request to generate a page with content;
       determine an output type for the page based on the received request;
       retrieve object data for the content of the page;
       determine the content for the page by:
          in response to determining whether the output type is a first type, serializing first content data for the determined first type of output type based on the retrieved object data;
          in response to determining whether the output type is a second type, serializing second content data for the determined second type of output type based on the retrieved object data; and in response to determining whether the output type is a third type, serializing third content data for the determined third type of output type based on the retrieved object data, wherein a serializer is retrieved by the server in response to determining whether the output is at least one selected from the group consisting of: the first type, the second type, and the third type, and wherein at least one selected from the group consisting of: the first content data, the second content data, and the third content data is serialized by the retrieved serializer, and generate the page to be transmitted for output based on at least one selected group consisting of: the serialized first content data for the determined first type, the serialized second content data for the determined second type, and the serialized third content data for the determined third type.

13. The system of claim 12, wherein the server retrieves the serializer for the third type by determining whether the retrieved serializer is defined, and serializing the third content data of the determined third type using the defined retrieved serializer based on the retrieved object data.

14. The system of claim 12, wherein the server determines whether the first content data, the second content data, or the third content data is defined, and generate the page to be transmitted for output based on the serialized first content data, second content data, or third content data when the first content data, the second content data, or the third content data is defined, and outputs an error notification when first content data, the second content data, or the third content data is undefined.

15. The system of claim 12, wherein the server retrieves the object data by retrieving the object data from a data cache communicatively coupled to the server, wherein the object data is canonical object data.

16. The system of claim 15, further comprising:
a storage device communicatively coupled to the server, wherein the server retrieves the object data by transforming raw object information into a canonical format based on raw data stored in the storage device when the object data is not defined.

17. The system of claim 16, wherein the server stores the transformed canonical object data in the storage device.

18. The system of claim 17, wherein the server retrieves executable script from an object descriptor.

19. The system of claim 18, wherein the server determines whether the executable script is defined.

20. The system of claim 19, wherein the server generates custom data using the executable script when the executable script is defined, and injects the generated custom data into the object data.

21. The system of claim 19, wherein the server determines whether an object of the object data has visible subcomponents.

22. The system of claim 21, wherein the server retrieves the subdata for the subcomponents and adds the subdata to a subdataset for each subcomponent in the object, and injects the subdataset into the object data.

* * * * *